US007866361B2

(12) United States Patent
Böhm et al.

(10) Patent No.: US 7,866,361 B2

(45) Date of Patent: Jan. 11, 2011

(54) DEVICE FOR THE MANUFACTURE OF ABSORBENT PRODUCTS

(75) Inventors: Thomas Böhm, Västra Frölunda (SE); Daniel Carlsson, Mölndal (SE)

(73) Assignee: SCA Hygiene Products AB, Gothenburg (SE)

( * ) Notice: Subject to any disclaimer, the term of this patent is extended or adjusted under 35 U.S.C. 154(b) by 187 days.

(21) Appl. No.: 12/306,101

(22) PCT Filed: Jun. 30, 2006

(86) PCT No.: PCT/SE2006/000816

§ 371 (c)(1),
(2), (4) Date: Dec. 22, 2008

(87) PCT Pub. No.: WO2008/002218

PCT Pub. Date: Jan. 3, 2008

(65) Prior Publication Data

US 2009/0272240 A1 Nov. 5, 2009

(51) Int. Cl.
*B32B 37/00* (2006.01)

(52) U.S. Cl. .................................... 156/510; 156/580.1

(58) Field of Classification Search ................ 156/73.1, 156/73.3, 250, 251, 510, 515, 530, 555, 580.1, 156/580.2, 582; 83/345, 346
See application file for complete search history.

(56) References Cited

U.S. PATENT DOCUMENTS

| | | | | | |
|---|---|---|---|---|---|
| 4,349,140 | A | * | 9/1982 | Passafiume | 225/97 |
| 5,363,728 | A | * | 11/1994 | Elsner et al. | 83/23 |
| 6,050,927 | A | | 4/2000 | Harrod | |

FOREIGN PATENT DOCUMENTS

| | | |
|---|---|---|
| SU | 1074629 | 2/1984 |
| WO | 97/23398 | 7/1997 |
| WO | 99/57050 | 11/1999 |

* cited by examiner

*Primary Examiner*—James Sells
(74) *Attorney, Agent, or Firm*—Drinker Biddle & Reath LLP

(57) ABSTRACT

A device for the manufacture of an absorbent product including a rotatable slitting tool having an extent in a radial direction and an extent in an axial direction perpendicular to the radial direction, the slitting tool being divided in the axial direction into two lateral parts and lying between them a central part. The central part has a circular cross section in the radial direction, and the lateral parts include, in the axial direction, intermittent protuberances projecting from the central part. The protuberances are the same distance from the center of the slitting tool as the circular cross section. The central part between the protuberances, in the direction of curvature of the envelope surface, forms a plurality of cutting edges, each of which has a width which, at a given pressure, permits slitting of a layer of material intended for the absorbent product, and the protuberances form supporting surfaces between the cutting edges.

11 Claims, 8 Drawing Sheets

DEVICE FOR THE MANUFACTURE OF ABSORBENT PRODUCTS

CROSS-REFERENCE TO PRIOR APPLICATION

This application is a §371 National Stage Application of PCT International Application No. PCT/SE2006/000816 filed Jun. 30, 2006.

FIELD OF THE INVENTION

The invention relates to a device for the manufacture of an absorbent product. The device comprises a rotatable slitting tool having an extent in a radial direction and an extent in an axial direction perpendicular to the radial direction. The slitting tool is divided in the axial direction into two lateral parts and lying between them a central part.

BACKGROUND OF THE INVENTION

The expression absorbent products is used here to denote diapers, sanitary towels, panty liners and incontinence articles.

Previously disclosed are a large number of processes for the manufacture of absorbent products, although a feature common to all these processes is the desire to achieve the highest possible rate of production. One way of achieving a high rate is to arrange the production facility in such a way that a continuous process is obtained, in which a plurality of material webs is brought simultaneously and continuously to different process stations for slitting, cutting, stretching of the material, shrinking, joining, etc., in order finally to obtain the finished product. The manufacture of an absorbent product is thus subject to special conditions, which means that the process is difficult to compare with another process, for example in the case of the manufacture of automobile components or in the ready-made garments industry.

The execution of slits in a layer of material by causing the layer of material to pass between a slitting tool and an abutment roller, which rotate in opposite directions relative to one another, is already familiar in the manufacture of absorbent products. The abutment roller has a circular cross section, and the slitting tool has a cutting edge which includes intermittently raised parts intended for cutting or perforating the layer of material.

The raised parts are pressed against the abutment roller in order for the cutting edge to produce its effect through the layer of material and, in this way, to bring about the desired slits.

One problem associated with the prior art is that the intermittent raised parts cause vibrations when the rollers rotate against one another, because the slitting tool does not have a circular cross section, and consequently give rise to an unequal pressure during rotation. The vibrations have the disadvantage that the manufacturing facility can only operate at a limited speed, because other parts of the machine and suspensions would otherwise be exposed to the risk of being shaken apart or affected by fatigue problems. A further disadvantage is that the wear on the slitting tool is considerable because that part of the cutting edge which first enters into engagement, after a period when the slitting tool is not in engagement with the abutment roller, is required to take up all the force unaided, which results in a shorter service life.

A wish and a need accordingly exist for an improved manufacturing process for slitting layers of material in conjunction with the manufacture of absorbent products.

BRIEF SUMMARY OF THE INVENTION

The object of the present invention is to solve the above problem, which problem is solved by means of a device intended for the manufacture of an absorbent product in accordance with the features of the present invention.

The device in accordance with the invention comprises a rotatable slitting tool having an extent in a radial direction and an extent in an axial direction perpendicular to the radial direction. The slitting tool is divided in the axial direction into two lateral parts and lying between them a central part. The central part has a circular cross section in the radial direction. The lateral parts comprise, in the axial direction, intermittent protuberances projecting from the central part, which protuberances follow the same radius as the circular cross section and which, together with the interjacent central part, form supporting surfaces. Between the protuberances and the supporting surfaces in the direction of curvature of the envelope surface, the central part forms a plurality of cutting edges, each of which has a width which, at a given pressure, permits slitting of a layer of material intended for an absorbent product. The central part thus forms an intermittent cutting part comprising the cutting edges, and the slitting tool forms a circular slitting knife comprising the intermittent edges and the above-mentioned supporting surfaces.

One advantage of the invention is that the slitting tool has a constant radius on which the slitting tool can roll when it is in contact with an abutment roller. The protuberances which lie on the same radius as the central part together with the central part provide supporting surfaces for the slitting tool during a part of the rotation of the slitting tool and prevent slitting from taking place by the supporting surfaces absorbing forces from the abutment roller at the given pressure. In conjunction with slitting, the cutting edges roll on the same radius as the protuberances, which means that the previously familiar problems which arise in a transitional zone between parts with different radii are avoided entirely. Vibrations are avoided by the constant radius, and a higher process rate can be maintained. The service life of the slitting tool also increases dramatically and, under optimal conditions, the slitting tool can have a service life corresponding to that of a cylindrical unit made of the same material. The cutting edges can be executed with any desired width and length for the desired size of the slit.

Slitting can be fully or partially through going in the layer of material, and slitting can be performed by crushing the material or by cutting. In the case of crushing, the slitting tool makes contact with a cylindrical abutment roller with the layer of material positioned in between, and where the layer of material is moving at the same speed as the slitting tool. In the case of cutting, the layer of material has a different relative speed compared with the peripheral speed of the cutting edges. In conjunction with cutting, the slitting tool makes contact with an abutment roller of the kind described above, or with another slitting tool embodied in the same manner as the first, where the cutting edges of both slitting tools are in contact with one another.

In conjunction with the manufacture of an absorbent product, it is sometimes desirable to execute slits in a layer of material, as mentioned above. The slits can provide tear indications, fold indications or can impart air permeability and liquid permeability to an airtight material. The layer of material is then passed in accordance with the invention between the slitting tool and an abutment roller, which rotate relative to one another in opposite directions. The abutment roller has a circular cross section, and the slitting tool comprises the cutting edges and the supporting surfaces mentioned above.

When the narrower cutting edges are caused to rotate against the abutment roller, the combination of the pressure of the slitting device against the abutment roller and the small width of the cutting edge results in cuts being made in the layer of material, in conjunction with which the slits are formed.

According to one embodiment of the invention, the slitting tool is manufactured from a cylindrically shaped disc, where the cutting edges are created by removing material from the envelope surface of the cylinder in such a way that only the central part remains between the unprocessed parts of the envelope surface which form the protuberances and the supporting surfaces. This method of manufacturing the slitting tool is simple and inexpensive and results in a slitting tool with an increased service life.

According to another embodiment, the slitting tool is manufactured by molding the desired form. Finishing operations, such as turning, grinding and polishing, may be carried out.

According to a further, different embodiment of the invention, the slitting tool is manufactured from a blank having an envelope surface with a circular cross section and a central zone having a different width from the envelope surface in the axial direction. The central zone can possess a greater width than the envelope surface, but it can also possess a smaller width. The envelope surface comprises the protuberances and the cutting edges and can be manufactured according to one or other of the embodiments mentioned above.

According to one embodiment of the invention, the slitting tool is manufactured by processing the envelope surface of a cylindrical unit in such a way that material is removed to either side of an interjacent part so that the interjacent part is provided with the desired protuberances and cutting edges.

According to one embodiment of the invention, the protuberances are symmetrical around the central part, but are capable in another embodiment of being arranged asymmetrically around the central part. The expression symmetrical is used here to denote that the protuberances are arranged in a mirror-inverted manner to either side of the central part, that is to say they have the same shape. The expression asymmetrical is used here to denote that the protuberances are arranged to either side of the central part, but where the protuberance on one side of the central part has a different appearance from the corresponding protuberance on the other side of the central part. The protuberances are nevertheless arranged in pairs to either side of the central part in such a way that those parts of the protuberances which border the central part are not displaced in relation to one another in the radial direction, that is to say that the protuberances start and end at the same point in the radial direction but, in the axial direction, to either side of the central part. The shape of the protuberances depends on the method of manufacture, but is not restricted to any particular shape. The protuberances can thus extend from the central part as far as the side parts, or they can extend from the central part in the direction of the side parts but to a position between the side parts and the central part. The protuberances can be arranged in the envelope surface essentially perpendicular to the extent of the cutting edges in the radial direction, but they can also be arranged at an angle greater than perpendicular to the extent of the cutting edge.

In all of the embodiments described above, the cutting edges are formed by the parts of the slitting tool which are constituted by the central part and which are present between the protuberances.

The device according to the invention can comprise a plurality of slitting tools arranged adjacent to one another in the axial direction. All the slitting tools can then act against the same abutment roller or against a plurality of abutment rollers. The different slitting tools can have the same diameter or different diameters. When the slitting tools act against a cylindrical abutment roller with a constant diameter, all of the slitting tools exert the same pressure against the abutment roller. If the cutting edges of the different slitting tools also possess the same width and form, slits with an identical appearance will result. When the slitting tools have different diameters, the slitting tools exert different pressures against an abutment roller with a constant diameter. The different pressures can give rise to slits with a different appearance, for example different depths in a layer of material. This effect can also be achieved by the different slitting tools having different diameters, but where the abutment roller also has different diameters for the different slitting tools.

The slitting tool and the abutment roller can be caused to rotate at the same peripheral speed, that is to say the relative speed at the contact surface between the slitting tool and the abutment roller is equivalent to zero.

As an alternative, the slitting tool and the abutment roller can be caused to rotate at different peripheral speeds, which results in the cutting edges having a higher or lower speed relative to the abutment roller and thus the layer of material, as a consequence of which the slitting tool processes the layer of material both by pressure and by cutting.

The slitting tool and the abutment roller can be manufactured from, for example, steel, carbide, ceramic materials or other suitable materials. The slitting tool can have a diameter of between 2 centimeters and 1 meter.

The layer of material can include any material that is suitable for use in an absorbent product. An absorbent product can comprise a top layer, a backing layer and between them an absorption body. The absorbent product can also comprise a receiving layer positioned between the top layer and the absorption body. The layer of material can have a thickness between 10 micrometers and 1 centimeter. The slitting tool can thus be used on one or other of these layers of material, but it is exemplified below in conjunction with the manufacture of a top layer.

The direction of the slits depends on a number of factors, such as the direction of movement of the web of material during the slitting operation and the choice of material for the top layer. It can be mentioned here by way of example that a slit will open when it is subjected to forces that are oriented at an angle away from the direction in which the slit extends. The natural tendency for the slit to open is at its greatest when the forces act upon the slit in a direction oriented at 90° to the direction in which the slit extends. The top layer is manufactured in a web of material having a movement in a machine direction which, in the finished product, can coincide with the longitudinal direction of the absorbent product or its lateral direction. In conjunction with its manufacture, the web of material is influenced by forces in the machine direction which cause slits which lie perpendicular to the machine direction to be influenced to a maximum extent by these forces. The forces involved in this case can cause the material to split at the slits or, at any rate, can cause the slits to open essentially permanently. What is more, the finished absorbent product will contain slits having an extent either in the longitudinal direction or in the lateral direction, which will mean that the slits are affected essentially only by forces from one direction. If the slits are instead oriented at an angle to the machine direction, the slits will lie at an angle to a longitudinally extending center line which, from the point of view of process technology, presents a smaller risk of the top layer splitting, and which, from the point of view of the product, imparts a shape to the slits that is affected by forces both from the lateral direction and from the longitudinal direction and at angles in between. The comparisons indicated above apply to slits with a given length. The fact that the slits are affected by forces in the lateral direction and in the longitudinal direction, and at angles in between, means that the natural tendency of the slits to open and close as the wearer moves will increase, because movement by the wearer gives rise to forces both in the lateral direction and in the longitudinal direction and in directions in between.

The slits themselves can be straight, S-shaped, V-shaped, Z-shaped, U-shaped, or can possess any other suitable shape. The slits can also comprise combinations of different shapes, for example a plurality of straight or curved slits situated in a row. The straight slits can be arranged in the absorbent product with the same or a different length, where every other slit is oriented at an angle (preferably essentially 90°) in relation to the preceding slit, but where the slits are situated at a distance from one another. The slits are thus present at an angle of between 0 and 180° relative to a longitudinally extending center line, preferably in the range from 20°-65° and/or 110°-155° in relation to the longitudinally extending center line. The curved slits can have parts that are angled in relation to one another and to the center line. The cutting edges are given a corresponding shape to form the above-mentioned slits, and as a result the manufacture of the slitting tool is more complicated than in the case of a straight cutting edge of the kind described above as being most advantageous from the manufacturing point of view. However, the cutting edges may be oriented in the direction of rotation or at an angle to the direction of rotation, depending on the desired shape of the slits.

A further advantage of the present invention is that one and the same slitting tool with intermittent edges can be used in order for the slits to obtain different angles in the layer of material, in that the shaft on which the slitting tool is arranged can be caused to rotate thanks to the fact that the slitting tool rolls on a constant radius. A further advantage associated with the fact that the slitting device rolls on a constant radius is that the need for other force-absorbing means to be mounted on the shaft in order to reduce vibrations is eliminated, which means that replacement of the slitting tool is simple and rapid.

The absorption body is manufactured from a suitable fiber material, in the form of natural or synthetic fibers having absorbent properties, or a mixture of natural fibers and synthetic fibers or other absorbent materials of a previously disclosed kind that are suitable for use in sanitary towels, incontinence pads and panty liners, for example. The absorption body can also contain a predetermined proportion, for example 20-60%, of superabsorbent materials, that is to say polymer materials in the form of particles, fibers, flakes or similar, which have the capacity to absorb and to chemically bind liquid equivalent to several times their own weight while forming an aqueous gel. This provides a very high water-absorbent capacity in the finished product.

Also, the absorption body can exhibit different forms, for example an essentially elongated and rectangular form, or alternatively some other more irregular form, for example hourglass or triangular. The absorption body also has preferably rounded edges.

The liquid-permeable top layer preferably includes the same material or a combination of the following materials: a fibrous material, for example a soft nonwoven material, although alternatively it can include other materials or material laminates. The top layer is preferably fully or partially perforated, that is to say slits are made in the top layer as described above, and holes can be present in the wet area. The top layer can appropriately include a perforated plastic film, for example a thermoplastic plastic material such as polyethylene or polypropylene, or a mesh-like layer of synthetic or textile material. Synthetic fibers, such as polyethylene, polypropylene, polyester, nylon or the like, are used by preference as a nonwoven material. Mixtures of different types of fibers can also be used for the aforementioned nonwoven material. In addition to nonwoven material, the top layers can also be formed by the processing of other materials, for example films made of thermoplastics such as polyethylene or polypropylene.

The invention can also be implemented with a top layer which includes different types of laminates or combinations of laminates and/or single layers. For example, the top layer can include a number of different laminates or single layers which cover parts of the surface of the product. In the event that the product includes a plurality of laminates or single layers, for example divided up into a plurality of longitudinal sections having different sections, these different sections can include different materials and can exhibit different characteristics. For example, each section can then have different types of perforation, hole positioning, dimensions, hydrophobicity, etc. The different sections can be joined together by means of ultrasonic welding in a previously disclosed manner that is not described here in detail.

The liquid-permeable top layer is preferably manufactured from a material that exhibits characteristics such as dryness and softness during the time when the absorbent product is being worn, because this top layer is in contact with the wearer's body. It is also desirable for the top layer to have a soft and textile-like surface which remains dry, even in the event of repeated wetting. The top layer can include a nonwoven material, for example, having a soft and smooth surface, such as a spunbond material made from polypropylene fibers. A perforated, hydrophobic nonwoven material may be used in order to permit the surface that is closest to the wearer's body to be kept dry, in conjunction with which holes are formed in the material that are larger than the distance between the fibers in the material. In this way, liquid can be led down through the holes in the top layer to the subjacent absorption body. Other examples of materials for the top layer are perforated plastic films, such as a perforated polyester film. The top layer can be joined together with the subjacent backing layer and the absorption body, for example by means of adhesive, ultrasonic joining or by means of some form of thermal bonding.

The top layer can also be a three-dimensional laminate of nonwoven and plastic film or a carded, thermally bonded material based 100% on polypropylene. The plastic film can be hydrophilic, pre-perforated (with small holes) and manufactured from a mixture of polyethylene and polypropylene. The nonwoven materials can have a weight per unit area in the range from 12-100 gsm, and in particular in the range from 15-60 gsm.

The nonwoven part of the top layer can also be a spunbond nonwoven material, an air-thru nonwoven material, a spunlace nonwoven (hydroentangled) material, a meltblown nonwoven material, or a combination of these. The raw material can be polypropylene (PP), polyethylene (PE) polyester (PET), polyamide (PA), or a combination of these. If a combination is used, this can be a mixture of fibers from different polymers, although each fiber can also contain different polymers (for example PP/PE bi-component fibers or PP/PE copolymers). Where appropriate, the plastic film can include PE or PP, PET, PLA or amyl (or any other thermoplastic polymer), or a mixture or copolymers of the aforementioned polymers.

The perforated top layer can also be manufactured from a single layer of material, such as a nonwoven material or a film (as described above).

The holes in the top layer can be oval and slightly elongated in the direction of the machine. The holes can be round/circular or oval in the direction of the machine or the transverse direction. The holes in the wet area can also be replaced by slits, which by definition differ from the holes in that the slits do not constitute constant openings, but instead are through going incisions in the layer of material. The slits are opened and closed by movement in the material.

According to one example of a top layer, the slits are preferably from 2 mm up to 15 mm in length, and preferably lie in the range from 3-10 mm. The length of the slits is measured along the boundary surfaces of the slits in a direction essentially perpendicular to the thickness of the top layer and when the slit is in its closed state.

The slits are arranged in the top layer with a mutual distance between the slits having a size in the order of 5-15 mm, although this is dependent on a range of factors, for which reason the distance between the slits can vary depending, among other things, on the material in the top layer and the length of the slits and the direction of the slits. This distance between the slits should be sufficiently great to prevent the top layer from being torn apart when the wearer moves, and sufficiently great to allow the slits to close in the desired manner without the influence of other slits, although at the same time it should be sufficiently small for the ability to breathe and the liquid permeability to remain at an acceptable level. The durability of the top layer is largely governed, however, by the relationship between the surface containing slits and the surface without slits for a given material strength, where the distance between the slits is a subset of the parameters for the durability. The length of the slits and the distance between the slits and the direction of the slits vary depending on the material in the top layer, because the natural tendency of the slits to open depends on the characteristics of the material present in the top layer.

The backing layer is preferably liquid-impermeable (or at least possesses high resistance to penetration by liquid) and is thus so arranged as to prevent any leakage of excreted fluid from the product. On the other hand, the backing layer may be executed so that it is vapour-permeable. For this purpose, the backing layer may be manufactured from a liquid-impermeable material which appropriately includes a thin and liquid-proof plastic film. For example, plastic films of polyethylene, polypropylene or polyester can be used for this purpose. Alternatively, a laminate of nonwoven and plastic film or other suitable layers of materials can be used as a liquid-proof backing layer. In a previously disclosed manner, the under side of the backing layer can be provided with beads of adhesive or some other previously disclosed attachment means, which can then be utilized for the application of the product to an item of clothing. The product can also be provided with wings, that is to say folding flaps which, in a previously disclosed manner, are arranged along the sides of the product and can be utilized in conjunction with the application of the product.

The product can also include a further layer of material in the form of a receiving layer (also referred to as an acquisition layer, an admission layer and a distribution layer, depending on the function of the material). The receiving layer can be in the form of a wadding material having an appropriately specified thickness and resilience, which is intended to be positioned between the absorption body and the top layer. The receiving layer possesses essentially the same dimensions as the top layer, with the exception of its thickness, however, which can deviate from the thickness of the top layer. It is also possible to establish that the receiving layer can include materials other than wadding material. For example, it may include a so-called airlaid material, which is usually based on cellulose fibers. The receiving layer can also incorporate fibrous materials in order to impart an appropriately balanced rigidity to it. The admission layer can also incorporate an appropriate quantity of thermoplastic fibers in order to permit ultrasonic welding.

The receiving layer can appropriately be a porous, elastic, relatively thick layer of material, for example in the form of a fibrous wadding material, a carded fiber wadding, a tow material, or some other kind of bulky and/or resilient fiber material with a high instantaneous liquid intake capacity that is capable of storing liquid temporarily before it is absorbed by the subjacent absorption body. The receiving layer can also be in the form of a porous foam material. It can also include two or more layers of material. According to a preferred embodiment, the receiving layer can extend towards the lateral edges of the product, that is to say it possesses essentially the same form as the top layer. In this way, advantages can be achieved in respect of liquid distribution, edge sealing, etc.

However, the choice of material and the thickness and the density of the layer of material may change in the future in the event of changed manufacturing methods and new material combinations, as a consequence of which the invention is not restricted to the materials and material combinations indicated above.

When manufacturing the absorbent product, the top layer is joined to the backing layer and can also be joined to the receiving layer and/or the absorption body. Joining can take place by gluing; or by welding by means of ultrasonic or laser; or by mechanical joining, for example in the form of embossing or compression, etc., or by some other appropriate method of joining, for example thermal bonding.

According to one embodiment of the invention, the device comprises a joining device for the above joining process. The joining device can comprise a device for a thermal bonding process, for example an ultrasonic welding device, or a mechanical joining process in the form of embossing or compression with hot and/or cold rollers, etc. The joining device advantageously comprises a tool, for example an ultrasonic horn, and a pattern embossed continuously or discontinuously on the abutment roller in the form of one or a plurality of raised parts. The pattern is arranged at a predetermined distance from the slitting tool. The joining device influences the layer of material in a direction towards the raised parts, for example by means of pressure, heat and, where appropriate, vibrations at a predetermined frequency, in conjunction with which heat is generated in the material, which gives rise to a weld, or embossing, or the like, depending on the quantity of energy transmitted by the joining device to the layer of material. One advantage of such a device is that the welded joint or the embossing, etc., ends up at a reproducibly exact distance from the slits. In previously disclosed joining devices, the welding takes place at a separate work station remotely from the slitting, which gives rise to problems with the adaptation of the piece of material to be processed in order to obtain a welded joint or the like at a desired distance from a slit.

BRIEF DESCRIPTION OF THE DRAWINGS

The invention is described below in conjunction with a number of Figures, in which.

DETAILED DESCRIPTION OF THE PREFERRED EMBODIMENTS

Figure 1:
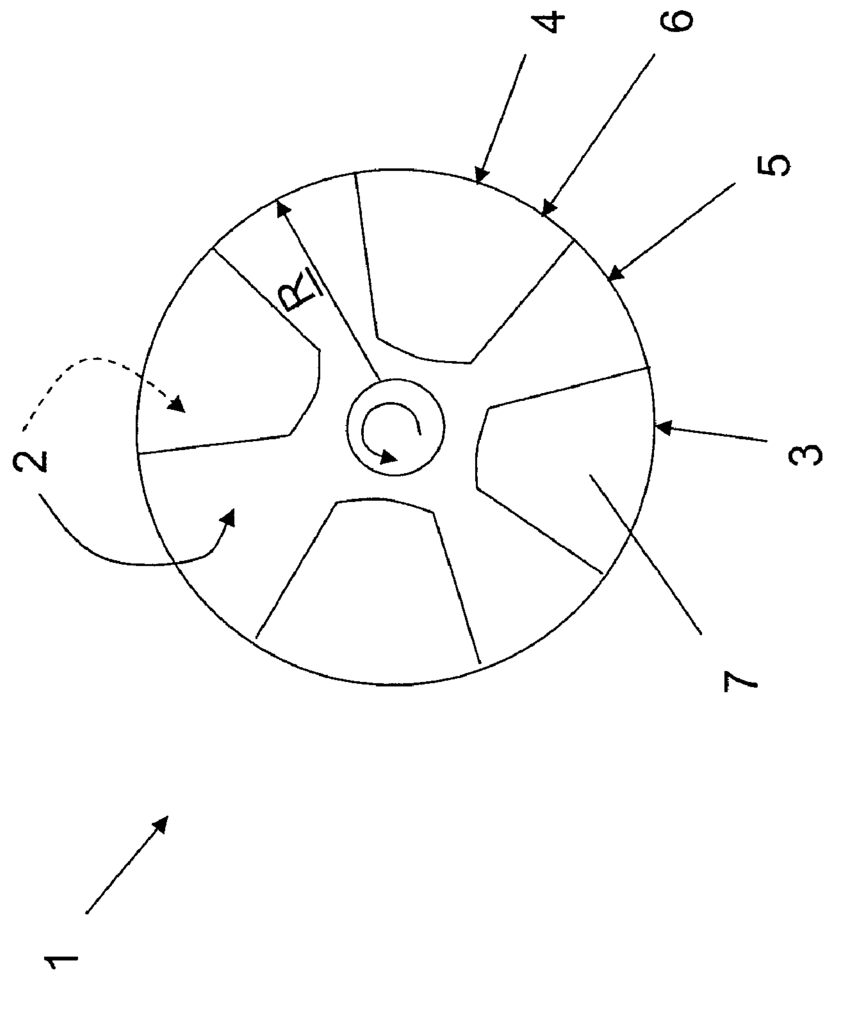
FIG. 1 depicts schematically a side view of a slitting tool in accordance with the invention.

FIG. 1 depicts schematically a side view of a slitting tool 1 according to the invention. The slitting tool has an extent in a radial direction with a maximum radius R, and an extent in an axial direction perpendicular to the radial direction. The extent in the axial direction is delimited by two opposing lateral surfaces 2, in conjunction with which the slitting tool 1 exhibits a width that is delimited by the lateral surfaces 2. The slitting tool 1 is divided in the axial direction into two lateral parts 3 and lying between them a central part 4. The central part 4 has a circular cross section in the radial direction, and the lateral parts 3 comprise, in the axial direction, intermittent protuberances 5 projecting in an axial direction from the central part 4. The protuberances 5 follow the same radius R as the circular cross section of the central part 4. Those parts of the lateral parts 3 that are present between the protuberances 5 have a radius that is smaller than the radius R of the central part 4 and the protuberances 5. Those parts of the central part 4 that are present between the protuberances 5, in the direction of curvature of the envelope surface, thus form a number of cutting edges 6, each of which has a width which permits slitting of a layer of material intended for an absorbent product.

The slitting tool 1 is manufactured from an essentially cylindrical blank that has been processed in such a way that selected parts of the blank have been removed, for example by grinding, milling or similar operations that are appropriate for metalworking. The part of the blank remaining after processing comprises the cutting edges 6, and that part of the blank which is left unprocessed comprises the protuberances 5. FIG. 1 shows that each processed area represents a field 7 which, in a two-dimensional projection, essentially possesses the form of a trapezoid, but where the parallel sides of the trapezoid have been replaced by semicircular sides, due to the fact that the blank has been processed according to FIG. 2 or 3. The fields 7 need not exhibit the form described above, but assume their form depending on how the blank was processed. Nevertheless, one side of the trapezoid will always have the same form as the envelope surface, that is to say semicircular form.

Figure 2:
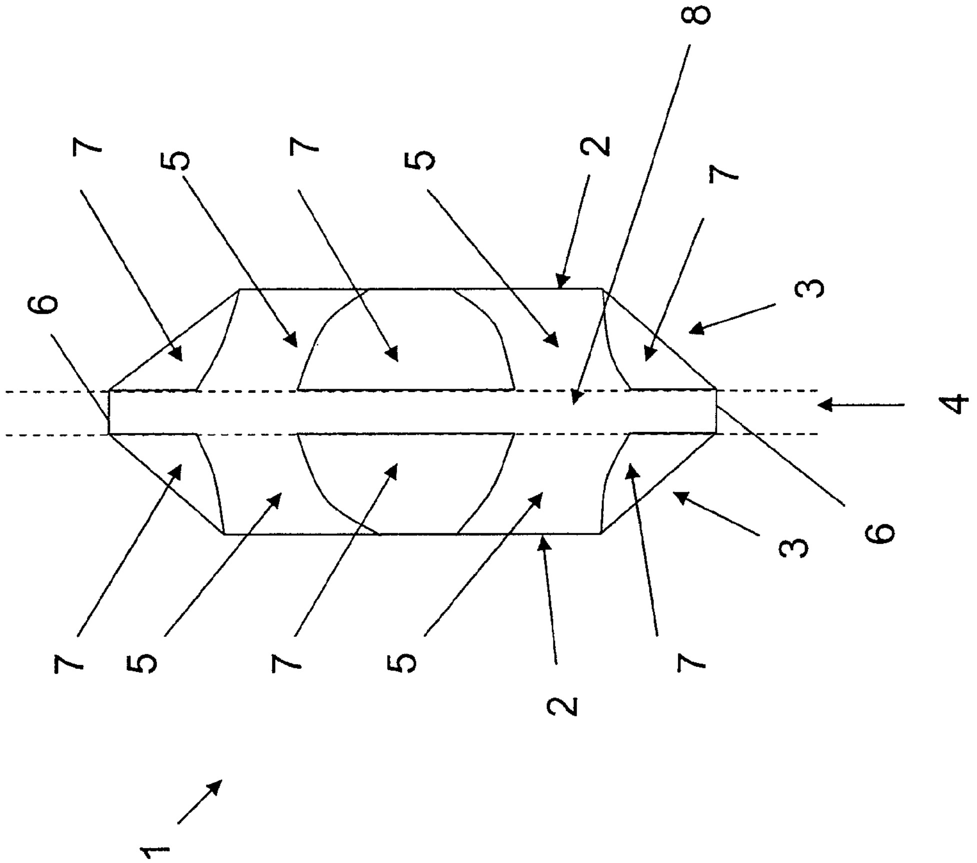
FIG. 2 depicts schematically a view from the front of the slitting tool according to a first embodiment of the invention.

FIG. 2 depicts schematically a view from the front of the slitting tool 1 according to a first embodiment of the invention. FIG. 2 shows that the cutting edges 6 have been formed by the cylindrical blank having been processed in such a way that each field 7 constitutes an angled plane taking as its starting point one edge of the cutting edge 6 to a point at a radial distance from the axial central axis of the slitting tool 1 which is smaller than the radius R. FIG. 2 shows that the central part 4 together with the protuberances 5 that are present in the lateral parts 3 form a supporting surface 8 having the same radius R as the central part 4. The supporting surfaces 8 in FIG. 2 exhibit at their locations an extent in the axial direction which corresponds to the maximum width of the slitting tool 1.

Figure 3:
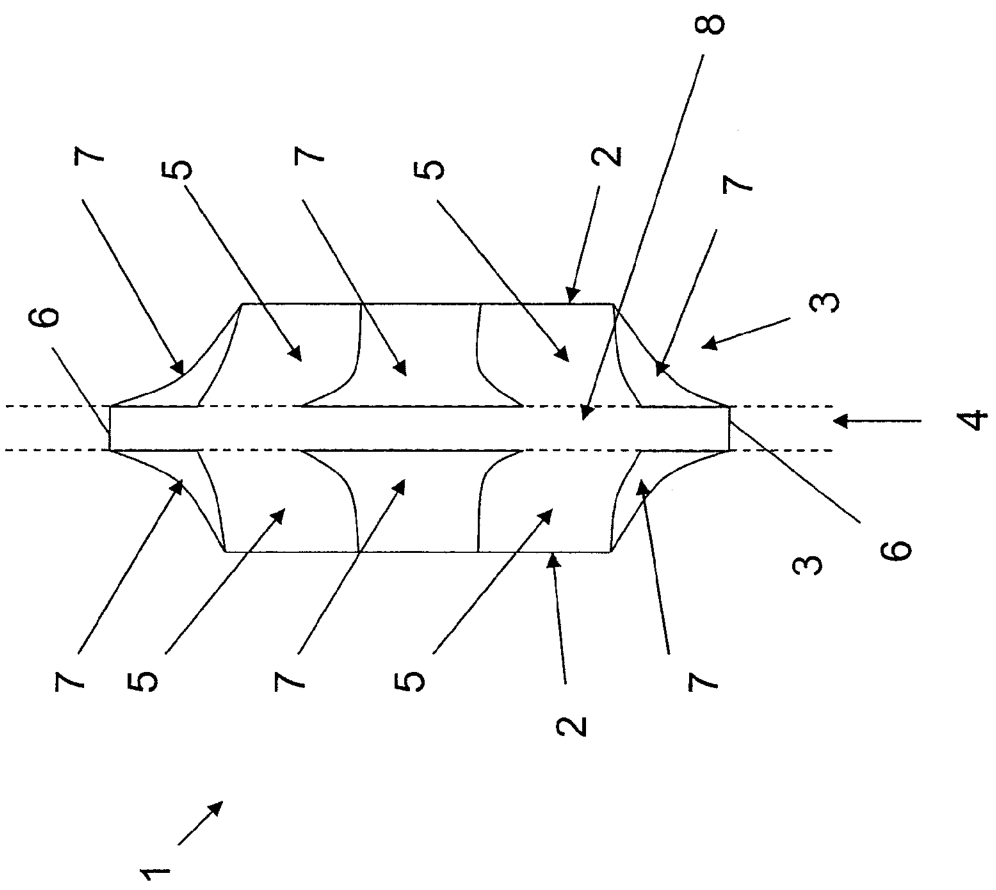
FIG. 3 depicts schematically a view from the front of the slitting tool according to a second embodiment of the invention.

FIG. 3 depicts schematically a view from the front of the slitting tool 1 according to a second embodiment of the invention. FIG. 3 shows that the cutting edges 6 have been formed by the cylindrical blank having been processed in such a way that each field 7 constitutes an angled and curved plane, taking as its starting point one edge of the cutting edge to a point at a radial distance from the axial central axis of the slitting tool which is smaller than the radius R. The curved plane has a steeper incline closer to the cutting edge 6 compared with the incline in the vicinity of the lateral surfaces 2.

The slitting tool 1 is illustrated in FIGS. 1-3 as a cylindrical unit, in which the lateral surfaces 2 are plane and parallel. The slitting tool 1 in accordance with the invention is not restricted to such plane lateral surfaces 2, however, but can have concave or convex lateral surfaces.

Figure 4:
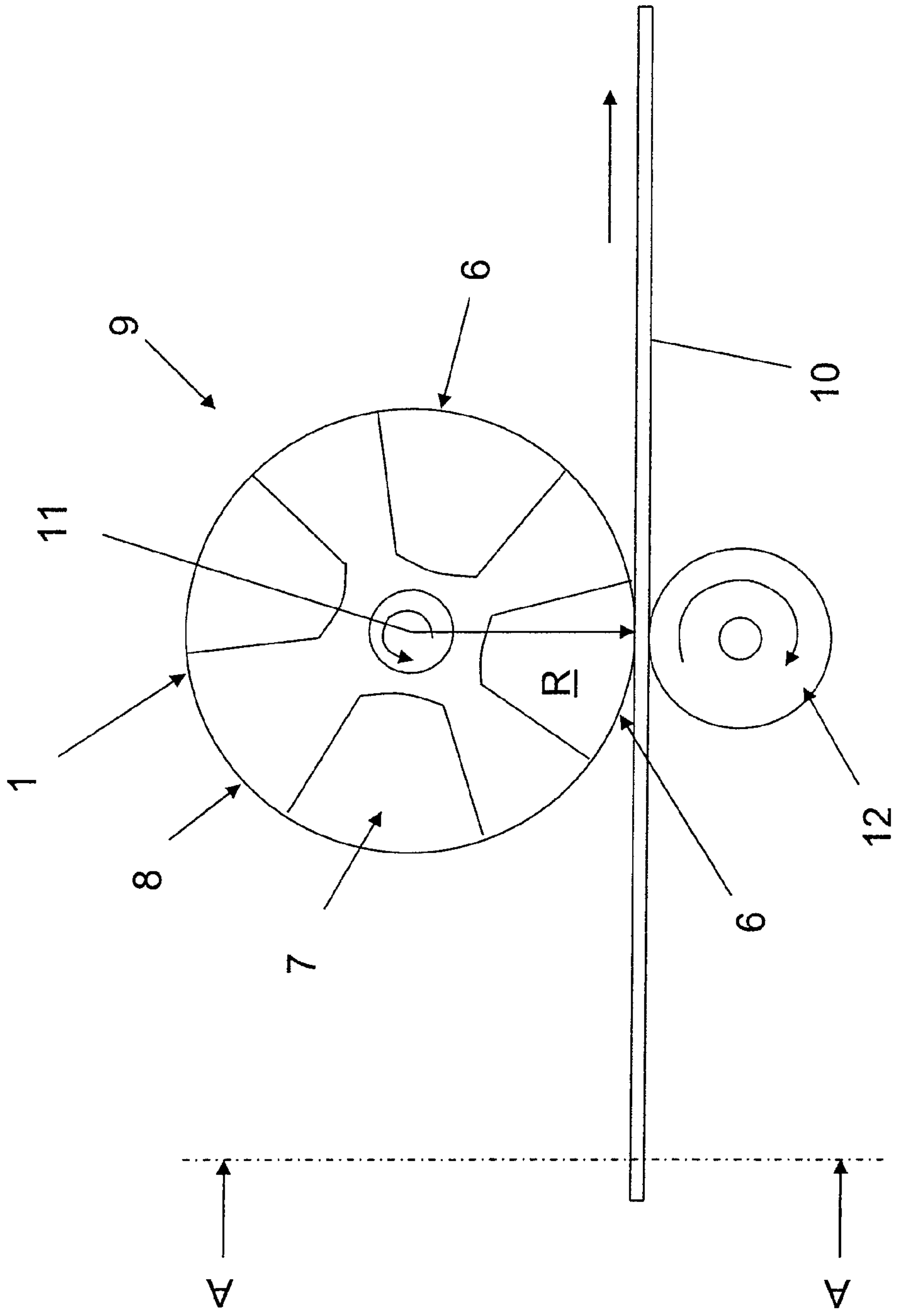
FIG. 4 depicts schematically a side view of a device for the manufacture of an absorbent product comprising the slitting tool according to FIGS. 1-3, where the slitting tool performs a slitting operation in a layer of material.

FIG. 4 depicts schematically a side view of a device 9 for the manufacture of an absorbent product comprising a slitting tool 1 according to FIGS. 1-3, where the slitting tool 1 performs a slitting operation on a layer of material 10. The device 9 comprises a shaft 11, on which the slitting tool 1 is mounted, and an abutment roller 12, which rotates in the opposite direction compared with the slitting tool 1. The directions of rotation of the two units are indicated in the Figure with arrows. FIG. 4 also shows that the layer of material 10 is arranged between the slitting tool 1 and the abutment roller 12. The layer of material 10 includes a material that is suitable for use in absorbent products. FIG. 4 shows that a cutting edge 6 processes the layer of material 10 during rotation of the slitting tool 1 and the abutment roller 12. The layer of material 10 moves in the direction of the arrow, and the movement coincides with the rotational movement of the slitting tool 1 and the abutment roller 12.

The device can be driven in various ways. The abutment roller 12 can be connected to a drive device and is able through its rotation to drive the layer of material 10 in its direction of movement. In one embodiment, the slitting tool 1 lacks a connection to a drive device and is only supported about the shaft 11. The layer of material 10 transfers its movement to the slitting device 1 through friction in this case. In another embodiment, the slitting tool 1 is connected to a drive device which imparts a rotation to the slitting tool 1. The abutment roller 12 in one embodiment is able to rotate here at the same peripheral speed as the slitting tool 1, in which case the layer of material 10 is driven at the same speed and is slit during rotation of the slitting tool. The abutment roller 12 in another embodiment is able to rotate at a different peripheral speed from the slitting tool 1, however, in which case the relative difference in speed gives rise to a shearing force in the layer of material 10, which enables the cutting edges to cut through the layer of material.

Depicted in FIG. 4 is one advantage of the invention, namely that the slitting tool 1 has a constant radius R on which the slitting tool 1 can roll when it is contact with the abutment roller 12, both during the slitting operation and during the intervening period when slitting does not take place. The protuberances 5 which lie on the same radius R provide supporting surfaces 8 for the slitting tool 1 during that part of the rotation when the slitting tool 1 does not perform slitting; see FIGS. 6 and 7. Vibrations are avoided by the constant radius R, and a higher process rate can be maintained, at the same time as the wear on the slitting tool is reduced.

Figure 5:
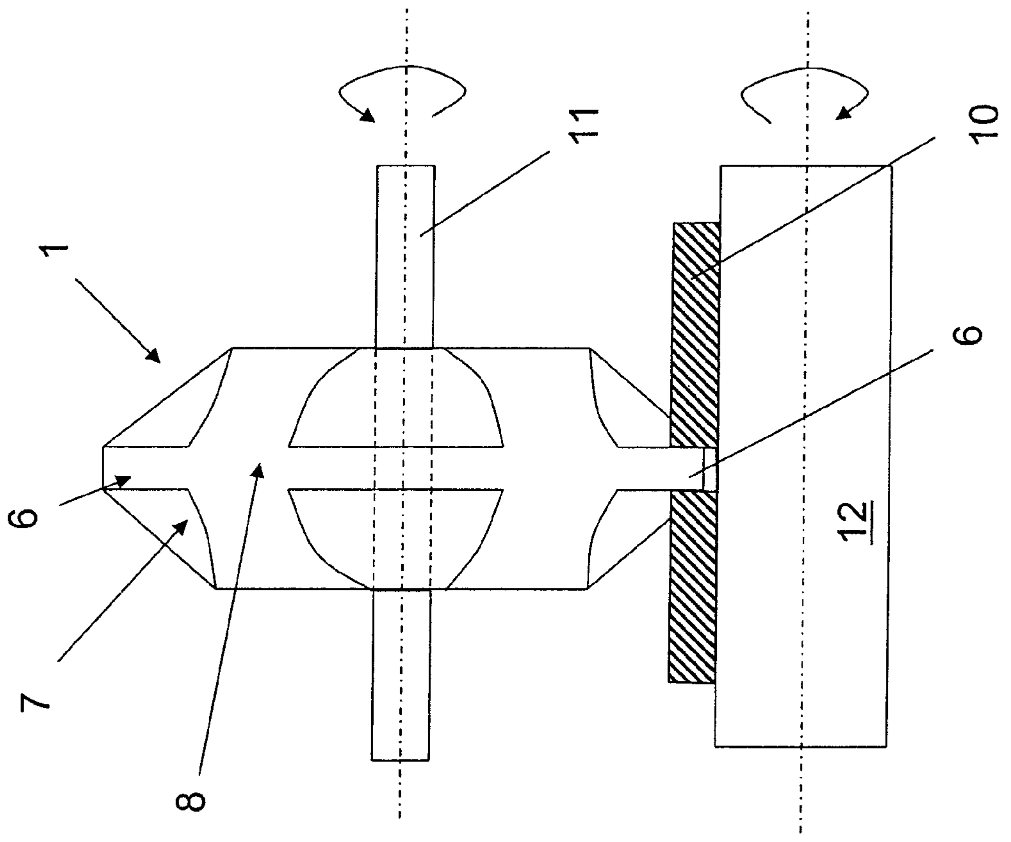
FIG. 5 depicts schematically a view of the device according to FIG. 4 from the line A-A in FIG. 4.

FIG. 5 depicts schematically a view of the device 9 according to FIG. 4 from the line A-A in FIG. 4. FIG. 5 depicts the layer of material 10 as a sectioned view, in which a cutting edge 6 of the slitting tool 1 is in contact with the abutment roller 12 with a pressure such that the cutting edge 6 has parted the layer of material 10. The parting can depend on crushing or cutting. This is a question of definition, which depends on the sharpness of the cutting edge 6, that is to say its width, and the pressure that has been established between the slitting tool and the abutment roller 12, as well as the characteristics of the layer of material 10. The narrower the cutting edge 6, the more easily it is able to cut through the layer of material 10, although a high pressure can compensate for a blunt cutting edge by crushing the layer of material 10. The characteristics of the layer of material 10 include, for example, the type of bonds which hold together the layer of material 10 in its longitudinal extent and the thickness of the layer of material 10.

Figure 6:
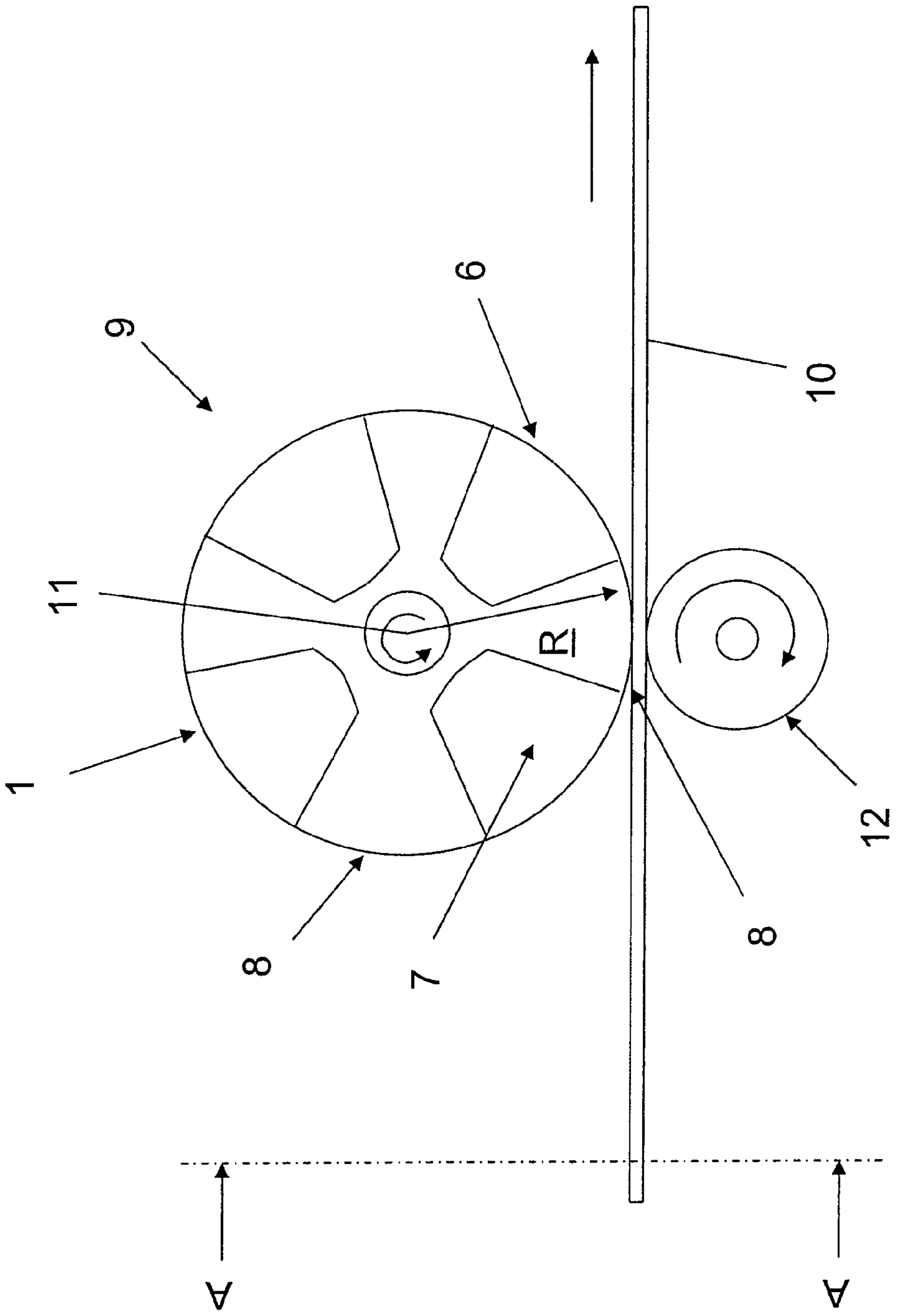
FIG. 6 depicts schematically a side view of a device for the manufacture of an absorbent product according to FIG. 4, but where the slitting tool is in a position in which slitting of the layer of material does not occur.

FIG. 6 depicts schematically a side view of a device 9 for the manufacture of an absorbent product according to FIG. 4, but where the slitting tool 1 is in a position in which slitting of the layer of material 10 does not occur. FIG. 6 depicts the slitting tool 1 in a position in which a non-cutting supporting surface 8, comprising the center part 4 together with the protuberances 5 that are present in the lateral parts 3, make contact with the layer of material 10.

Figure 7:
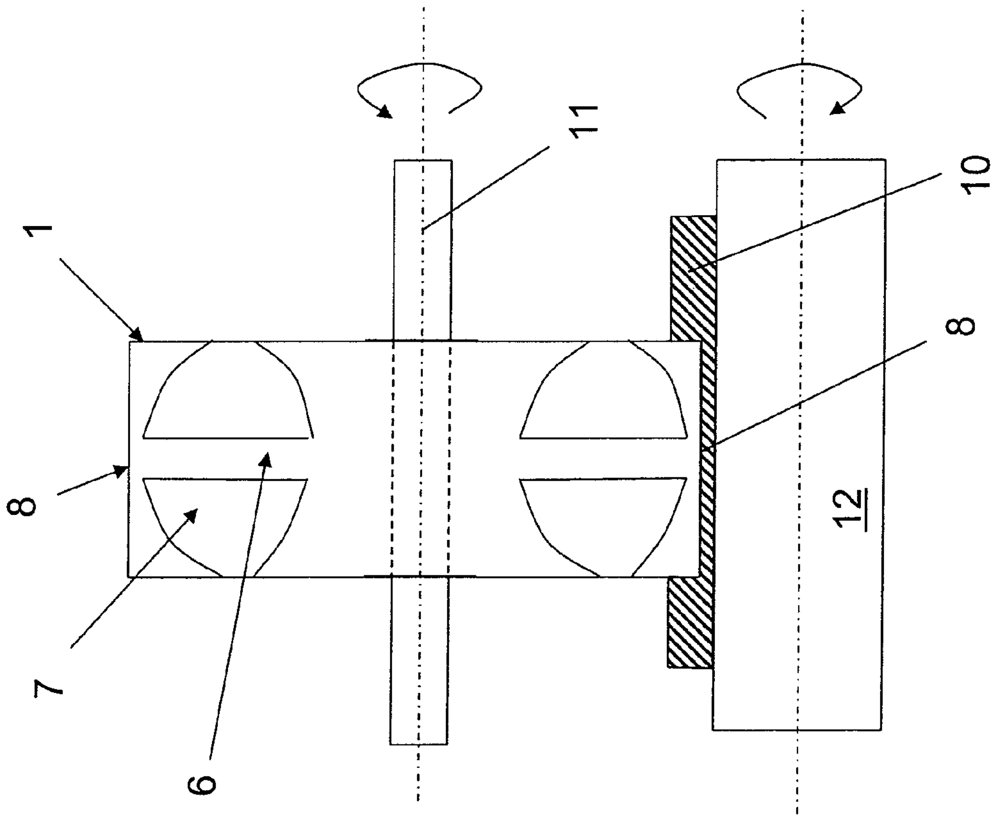
FIG. 7 depicts schematically a view of the device according to FIG. 4 from the line A-A in FIG. 6; and where

FIG. 7 depicts schematically a view of the device 9 according to FIG. 6 from the line A-A in FIG. 6. FIG. 7 shows that the protuberances 5 in the lateral parts together with the central part 4 form a uniform supporting surface 8 in the envelope surface having the same radius R and having a width corresponding to the maximum width of the slitting tool 1 in the envelope surface. FIG. 7 shows that the layer of material has been compressed by the slitting tool 1 and the abutment roller 12, but that the layer of material 10 does not rupture as in the case when the cutting edge 6 passes. This is because the pressure between the slitting tool 1 and the abutment roller 12 has been adapted in such a way that, at a given pressure, slitting does not take place when the supporting surface 8 passes the layer of material 10, but that slitting does take place when the narrower part of the cutting edge 6 passes the layer of material 10 due to the fact that the pressure per square meter increases in inverse proportion to the reduction in the area.

Figure 8:
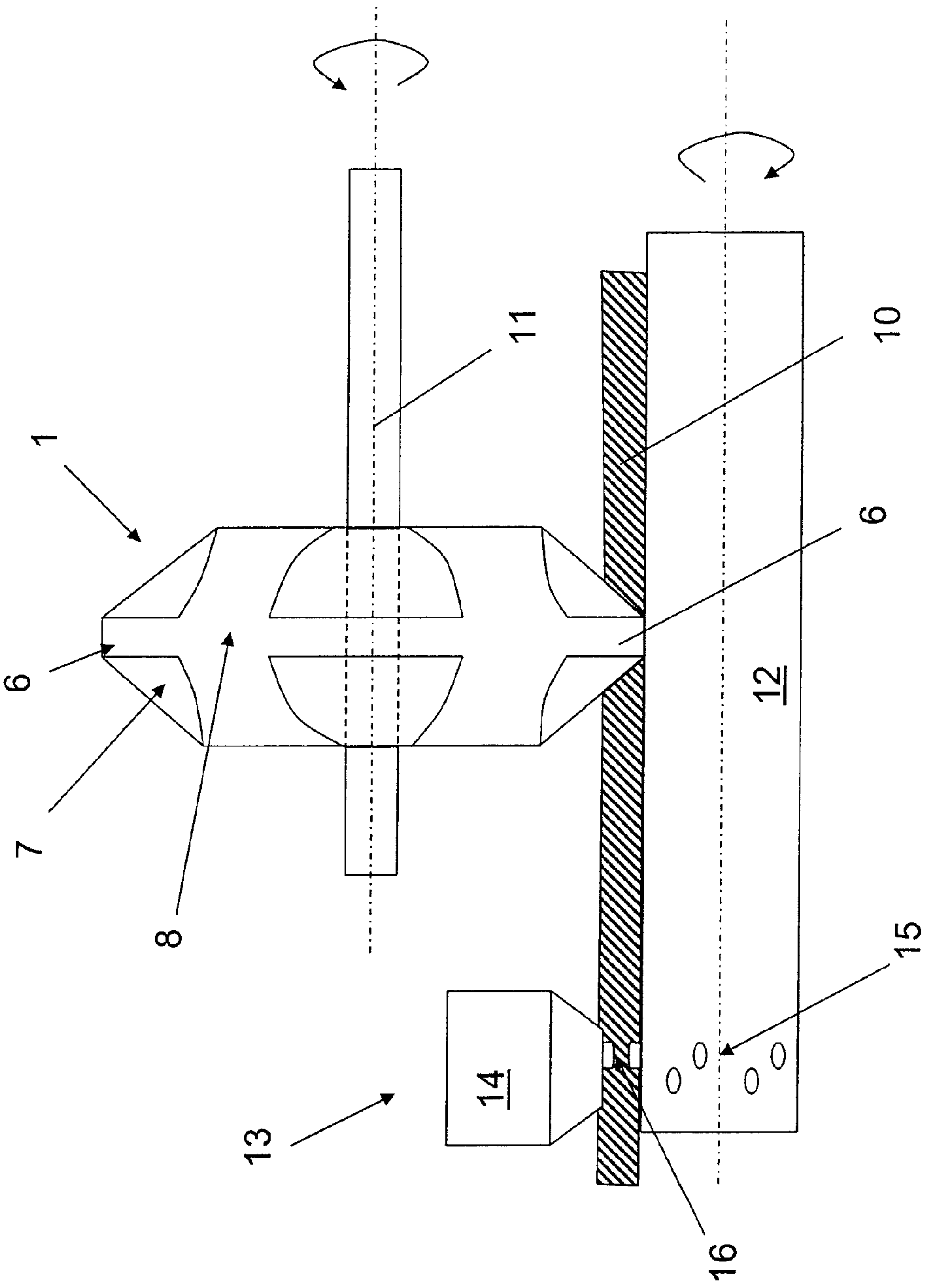
FIG. 8 depicts schematically a view from the line A-A of the device according to FIG. 4 according to an embodiment in which the device also comprises an ultrasonic device.

FIG. 8 depicts schematically a view from the line A-A of the device 9 according to FIG. 4 according to an embodiment of the invention in which the device 9 also comprises a joining device in the form of an ultrasonic device 13. The ultrasonic device 13 comprises an ultrasonic horn 14 and a pattern embossed on the abutment roller in the form of raised parts 15. In FIG. 8, the pattern 15 is arranged at a predetermined distance from the slitting tool 1. The ultrasonic device 13 affects the layer of material 10 in that the ultrasonic horn 14 exerts pressure and vibrates at a frequency against the layer of material 10 and the raised parts 15, in conjunction with which heat is generated in the material, which gives rise to a weld or embossing or the like, depending on the quantity of energy transmitted by the ultrasonic device 13 to the layer of material 10. FIG. 8 shows that the ultrasonic device 13 has produced embossing 16 in the layer of material 10. One advantage of this embodiment is that the embossing 16 ends up at exactly the same distance from the slit parts in the layer of material 10 for the entire duration of the continuous process, because the raised parts 15 are positioned at a predetermined distance from the slitting tool 1.

The invention claimed is:

1. A device for the manufacture of an absorbent product, comprising a rotatable slitting tool for the intermittent processing of the absorbent product, having an extent in a radial direction and an extent in an axial direction perpendicular to the radial direction, the slitting tool being divided in the axial direction into two lateral parts and lying between them a central part, wherein the central part comprises a circular cross section in the radial direction, and the lateral parts comprise, in the axial direction, intermittent protuberances projecting from the central part, wherein protuberances are the same distance from the center of the slitting tool as the circular cross section, and wherein the central part between the protuberances, in the direction of curvature of the envelope surface, forms a plurality of cutting edges, each of which has a width which, at a given pressure, permits slitting of a layer of material intended for the absorbent product, and the protuberances form supporting surfaces between the cutting edges.

2. The device according to claim 1, wherein the supporting surfaces are arranged to absorb forces to prevent slitting when the supporting surfaces are in contact with the layer of material.

3. The device according to claim 2, wherein the device comprises an abutment roller arranged to rotate with the slitting tool to pass the material between the slitting tool and the abutment roller.

4. The device according to claim 3, wherein the abutment roller rotates at the same peripheral speed as the slitting tool.

5. The device according to claim 1, wherein the device comprises a plurality of slitting tools positioned adjacent to one another in the axial direction.

6. The device according to claim 1, wherein the slitting tool is manufactured from an essentially cylindrical disc, where the cutting edges are formed by removing portions from the envelope surface of the disc to form the cutting edges and the supporting surfaces.

7. The device according to claim 1, wherein the slitting tool is manufactured by molding, after which the cutting edges and the supporting surfaces are finished by turning and/or grinding and/or polishing.

8. The device according to claim 1, wherein the slitting tool is manufactured from a blank which, in a central zone, possesses a width in the axial direction that differs from the width in an external peripheral zone in the radial direction, the peripheral zone containing the cutting edges and the supporting surfaces.

9. The device according to claim 1, wherein the slitting tool has a diameter of between 2 centimeters and 1 meter.

10. The device according to claim 1, wherein the device comprises a joining device comprising a tool and a pattern in the form of one or a plurality of raised parts embossed continuously or discontinuously on the abutment roller, wherein the tool transmits a quantity of energy to the layer of material in the direction of the raised parts to change the structure of the layer of material.

11. The device according to claim 3, wherein the abutment roller rotates at a different peripheral speed from the slitting tool.

* * * * *